United States Patent [19]

Furukawa et al.

[11] Patent Number: 4,737,535

[45] Date of Patent: Apr. 12, 1988

[54] RUBBER COMPOSITION FOR TIRE TREAD

[75] Inventors: Hiroshi Furukawa, Ashiya; Yuichi Saito, Kobe; Akio Imai; Nobuyuki Yoshida, both of Ichihara, all of Japan

[73] Assignees: Sumitomo Rubber Industries, Ltd., Hyogo; Sumitomo Chemical Company, Limited, Osaka, both of Japan

[21] Appl. No.: 817,949

[22] PCT Filed: Apr. 18, 1985

[86] PCT No.: PCT/JP85/00217

§ 371 Date: Dec. 17, 1985

§ 102(e) Date: Dec. 17, 1985

[87] PCT Pub. No.: WO85/04888

PCT Pub. Date: Nov. 7, 1985

[30] Foreign Application Priority Data

Apr. 20, 1984 [JP] Japan .................................. 59-80665

[51] Int. Cl.$^4$ .............................. C08K 5/10; C08K 3/04
[52] U.S. Cl. .................................. 524/113; 524/285; 524/311; 524/313; 524/314; 525/237; 525/332.9
[58] Field of Search ............... 524/314, 285, 313, 311, 524/113, 496; 525/237, 332.9, 237, 332.9

[56] References Cited

U.S. PATENT DOCUMENTS 4,061,612 12/1977 Bertozzi et al. ..................... 524/290
4,383,085 5/1983 Fujimaki et al. ..................... 525/196
4,463,133 7/1984 Takeuchi et al. ..................... 525/97
4,471,093 9/1984 Furukawa et al. ................... 525/237
4,482,678 11/1984 Furukawa et al. ................. 525/332.9
4,485,205 11/1984 Fujimaki et al. ..................... 525/211
4,523,618 6/1985 Yamamoto et al. ............. 525/332.9
4,540,744 9/1985 Oshima et al. ................... 525/332.9

FOREIGN PATENT DOCUMENTS 102045 7/1984 European Pat. Off. .
2397131 2/1979 France .
0044695 12/1979 Japan .
0024733 2/1984 Japan .
1542061 3/1979 United Kingdom .

Primary Examiner—Herbert J. Lilling
Attorney, Agent, or Firm—Armstrong, Nikaido, Marmelstein & Kubovcik

[57] ABSTRACT

A tire tread rubber composition which is improved in grip characteristic, steering stability characteristics and low-temperature characteristics, containing 15 to 50 parts by weight of a particular styrene-butadiene rubber obtained by solution polymerization containing polymer chains modified with trifunctional and/or tetrafunctional coupling agents, 50 to 85 parts by weight of at least one rubber selected from the group consisting of emulsion-polymerized styrene-butadiene rubber, natural rubber, synthetic polyisoprene rubber and butadiene rubber, at least one compound as plasticizer selected from the group consisting of a sebacic acid ester, an adipic acid ester and a fatty acid ester, and carbon black having an average particle size of not more than 30 m$\mu$.

3 Claims, No Drawings

RUBBER COMPOSITION FOR TIRE TREAD

DESCRIPTION

1. Technical Field

The present invention relates to a tire tread rubber composition improved in grip characteristics, steering stability and low temperature characteristics.

2. Background Art

In recent years, tires have been increasingly demanded to have a strong gripping force and a steering stability with development of automobiles having high performances. For instance, in order to increase an area contacting the ground, tires having an aspect ratio as high as 60% or 50% are developed and put on the market. With respect to such tires, from the viewpoint of the structure, the responsibility is improved by making the surface of tread flat to increase the effective ground-contacting area and increasing the width of a steel belt to increase the rigidity of the tread portion, and improvements in cornering characteristics and handle responsiblity are contemplated by reinforcing the bead portion with fibers or steel cords. Also, from the viewpoint of the formulation for tread rubber which directly contacts the surface of road, a high styrene SBR which has a high styrene content is mainly employed as a polymer for the purpose of improving the grip characteristic, and also, in recent years, it is proposed to use a solution-polymerized SBR, the styrene content and vinyl content of which are somewhat higher than those of a conventional emulsion-polymerized SBR, in tread rubber for such high performance tires.

Further, as carbon black, those called N 339, N 200, N 110, etc. in ASTM which have a relatively small particle size are used in a large amount to make the hardness somewhat higher than that of general tires, whereby improvements in responsibility and steering characteristics are contemplated.

Since in such high performance tires the grip characteristic is improved by using a high styrene SBR or solution-polymerized SBR having a high glass transition temperature (Tg), the tires have the drawback that under a low temperature condition like the winter season, the rubber becomes hard, so the tread surface cannot meet small roughness of the road, thus the effective ground-contacting area is decreased and consequently the grip is lowered. When the hardness at a low temperature is lowered, for instance, by using a softening agent such as an oil, etc. in order to eliminate this drawback, the hardness at ordinary temperature is also lowered simultaneously, thus resulting in lowering of the handle responsibility. This has hitherto been a problem.

DISCLOSURE OF THE INVENTION

The present invention relates to an improvement in the drawback that a conventional high performance tire tread rubber wholly loses the grip characteristic at a low temperature because of becoming hard, when such a hardness as exhibiting steering characteristics at a temperature in running is imparted to the rubber.

That is to say, the present invention relates to an entirely new tread rubber composition that the grip characteristic and steering stability characteristic are maintained by using an improved solution-polymerized SBR and the low temperature characteristics are improved by using a low-temperature resisting plasticizer.

In accordance with the present invention, there is provided a rubber composition for tire tread comprising 15 to 50 parts by weight of a solution-polymerized styrene-butadiene rubber which has an intrinsic viscosity of from not less than 1.7 to less than 3.0 in toluene at 30° C., a bonded styrene content of from not less than 27% by weight to less than 40% by weight and a vinyl content in butadiene portion of from not less than 37% by weight to less than 45% by weight, and in which the proportion of the polymer chains modified with a trifunctional or tetrafunctional coupling agent if from 40 to 65% by weight, 50 to 85 parts by weight of at least one rubber selected from the group consisting of an emulsion-polymerized styrene-butadiene rubber, natural rubber, a synthetic polyisoprene rubber and a butadiene rubber, at least one plasticizer selected from the group consisting of a sebacic acid ester, an adipic acid ester and a fatty acid ester, and carbon black having an average particle size of not more than 30 millimicron.

In the present invention, the particular styrene-butadiene rubber (SBR) prepared by a solution polymerization is employed. When the intrinsic viscosity is less than 1.7 in the toluene solution at 30° C., the rolling resistance characteristic of tires is lowered, and when the intrinsic viscosity is not less than 3.0, the processability such as kneading and extrusion is impaired, thus resulting in serious defect in tire manufacturing. Also, when the content of bonded styrene in SBR is less than 27% by weight, the wet grip characteristic is impaired, and when the content is not less than 40% by weight, heat generation is large and accordingly the durability and rolling resistance in high speed running are lowered. Further, when the vinyl content in butadiene portion is less than 37% by weight, the wet grip characteristic is impaired, and when the content is not less than 45% by weight, the tear resistance at high temperatures is lowered, thus causing damage in the tread portion at the time of finishing the vulcanization of tires, namely the so-called demould splitting. Also, the polymer chains are modified with a trifunctional or tetrafunctional coupling agent in order to obtain a rubber composition excellent in processabilities, particularly in roll bagging property, extruded sheet skin and sheet stickiness, but when the proportion of the modified polymer chains in the solution-polymerized SBR is less than 40% by weight, the effect of improving these processabilities is small, and when the proportion is more than 65% by weight, the sheet stickiness is lowered through the bagging property and the sheet skin are improved.

As a process for preparing the polymer containing such modified polymer chains (branched polymer chains), a known living anionic polymerization process using an alkali metal compound as a polymerization initiator is effective, and there can be adpoted a process wherein an agent for coupling the ends is acted on the solution of the living active polymer, thereby coupling the active polymer ends with each other. For instance, the solution-polymerized SBR used in the present invention is prepared by a process as mentioned below. Upon copolymerizing styrene and butadiene in a hydrocarbon solvent using an organic alkali metal compound as an initiator, the copolymerization is carried out in the presence of a Lewis basic compound such as ether compounds or tertiary amine compounds, and a trifunctional and/or tetrafunctional coupling agent is caused to react with the so-called living active ends in the resulting copolymer solution, thus the SBR is synthesized. From the viewpoint of the stability in the polymerization reaction, in particular alkyllithium compounds are preferably employed as the organic alkali metal compounds. Also, as the trifunctional or tetrafunctional coupling agents, halogen-containing compounds, e.g. trichloromethylsilane, silicon tetrachloride, tin tetrachloride and the like, are preferably employed from the viewpoint of the controllability of the coupling reaction.

In that case, the weight proportion of the coupled polymer chains having branch in the polymer can be read from the molecular weight distribution measured by gel permeation chromatography (GPC). That is to say, the relative ratio of the height of the peak corresponding to the average molecular weight of the coupled polymer chains having branch to the height of the peak corresponding to the average molecular weight of the polmer chains having no branch (nonmodified polymer chains) is defined as the weight ratio of the respective polymer chains.

In the solution-polymerized SBR, the coupled polymer chains are able to have a form modified with either the trifunctional coupling agent or the tetrafunctional coupling agent, or with a mixture thereof.

For obtaining such a desired proportion of the modified polymer chains, the molar ratio of the coupling agent used to the active polymer ends should be controlled in the preparation of styrene-butadiene rubber and, for instance, in case of using a tetrafunctional coupling agent, the amount thereof is selected from 0.175 to 0.250 mole per mole of the active polymer ends.

In the present invention, it is necessary that 15 to 50 parts by weight of the above-mentioned solution-polymerized SBR is contained. When the amount is less than 15 parts by weight, improvements in the grip and steering stability performances are not seen and, on the other hand, when the amount is more than 50 parts by weight, the rubber hardness at low tempeatures rises and accordingly it is not preferable because of leading to lowering of the grip characteristic.

Preferably, the polymers to be admixed with the solution-polymerized SBR are an emulsion-polymerized SBR (for example, SBR having a styrene content of 23.57% by weight and a vinyl content of 18.7% by weight), but in addition thereto, diene rubbers such as natural rubber, synthetic polyisoprene rubber and polybutadiene rubber can be employed. These rubbers may be employed alone or in admixture thereof, and the amount thereof is selected from 50 to 85 parts by weight.

In the present invention, in order to improve the tire performances at low temperatures while maintaining the grip and steering characteristics obtained by the use of the solution-polymerized SBR, at least one compound selected from the group consisting of sebacic acid esters, adipic acid esters and fatty acid esters is used as a low-temperature resisting plasticizer. By the use of the low-temperature resisting plasticizer, rise of the hardness at low temperature can be controlled as small as possible, thus the tread can meet small roughness of the road even at low temperatures and the steering characteristics in the winter season or a cold district are raised. The low-temperature resisting plasticizer is employed in an amount of 3 to 20 parts by weight, preferably 5 to 10 parts by weight, per 100 parts by weight of the rubber component. Examples of the sebacic acid ester plasticizer are, for instance, dimethyl sebacate, diethyl sebacate, dibutyl sebacate, di(2-ethylhexyl)sebacate, diisooctyl sebacate, and the like. Examples of the adipic acid ester plasticizer are, for instance, di-n-butyl adipate, diisobutyl adipate, di(2-ethylhexyl)adipate, diisooctyl adipate, diisodecyl adipate, octyldecyl adipate, and the like. Examples of the fatty acid ester plasticizer are, for instance, methyl oleate, butyl oleate, methoxyethyl oleate, tetrahydrofurfuryl oleate, and the like.

In the present invention, in order to improve the steering characteristics and the abrasion resistance, it is necessary that carbon black to be incorporated in the rubber composition has an average particle size of not more than 30 millimicron. For instance, carbon black called N 110, N 220, N 234, N 330 or N 339 in ASTM, or the like is employed. When the average particle size exceeds 30 m$\mu$, the reinforcing property is lowered and the abrasion resistance is inferior, and also the steering characteristics are lowered. Carbon black is employed preferably in an amount of 40 to 80 parts by weight per 100 parts by weight of the rubber component.

The rubber composition prepared as stated above is of course incorporated with additives used for usual tread rubber formulation, such as process oil, wax, antioxidant, curing agent, curing assistant and curing accelerator.

BEST MODE FOR CARRYING OUT THE INVENTION

The present invention is explained below by means of Examples, but the invention is not limited to the Examples. In the Examples, all parts and % are by weight unless otherwise noted.

Measurements of physical properties in the Examples and Comparative Examples were made under the following conditions.

Intrinsic viscosity [$\eta$]

The measurement was made at 30° C. in toluene solvent by employing an Ostwald's viscometer.

Proportion of modified polymer chains in styrenebutadiene rubber

A gel permeation chromatograph HLC-802UR made by Toyo Soda Manufacturing Co., Ltd. was used, and columns of $10^3$, $10^4$, $10^6$ and $10^7$ were selected as distribution columns. A refractometer was used as a detector. The molecular weight distribution of a polymer was measured at 40° C. by using tetrahydrofuran as a developing solvent. The relative ratio of the height of the peak corresponding to the average molecular weight of the modified polymer chains to the height of the peak corresponding to the average molecular weight of the nonmodified polymer chains was regarded as the weight ratio of the respective polymer chains.

Steel tires of 185/70HR/13 in size were prepared from rubber compositions of the formulation shown in Table 1. The rolling resistance, wet grip and steering stability were estimated. The manners of estimating them are as described below.

The rubber compositions and the results of the estimation of performances of tires obtained therefrom are shown in Tables 2 and 3, respectively. It is observed in Table 3 that the rubber compositions of the present invention (Examples) are superior in various properties.

Rolling resistance index

The above-mentioned tire was attached to a rim of 5½J×13, and the rolling resistance was measured by causing the tire to run on a 60 inch drum under conditions of 80 km/hour in speed, 2.10 kgf/cm$^2$ in inner pressure and 300 kg in load. The rolling resistance was represented in the Table as an index to the value of Comparative Example 1. The smaller the value, the more excellent the rolling resistance characteristic.

Wet grip index

The above-mentioned tires were attached to rims of 5½J×13, and they were attached to a 1500 cc passenger car. The car was run on a slippery concrete road sprinkled with water at a speed of 60 km/hour with one passenger. The friction coefficient μ was calculated from the stopping distance. It is shown as an index to the value of Comparative Example 1.

Steering stability characteristics

The above-mentioned tires were attached to a 1500 cc passenger car, and the car was run on the JARI total testing road with one passenger and an air pressure of 1.8 kgf/cm². The steering stability characteristics are shown as a relative value to the value of Comparative Example 1 regarded as standard value 3.0. The steering stability characteristics are estimated with respect to straight running stability, handle responsibility, ground-contacting property and convergency. Synthetic judgement with respect to each estimation is shown, and the larger the value, the better. In table, "+" mark attached to the right shoulder of a figure means being somewhat superior, and "−" mark means being somewhat inferior. Also, the tread rubber generates heat by running and consequentially the rubber hardness is lowered, thus resulting in lowering of the responsibility and occurrence of wobbling phenomenon. They are estimated as performance stability.

Running performance in winter season

Running performance at an atmospheric temperature of about −50° C. was estimated by a 5 point estimation method with respect to a general road without snow and a road covered with snow trodden hard.

TABLE 1

| Polymer | 100 parts by weight |
|---|---|
| Carbon | (varied amount) |
| Aromatic oil | 3 |
| Sebacic acid ester (Note 1) | (varied amount) |
| Wax | 2 |
| Antioxidant | 2 |
| Stearic acid | 1 |
| Zinc oxide | 3 |
| Sulfur | 1.75 |
| Accelerator (Note 2) | 1 |

(Note 1) Dioctyl sebacate (specific gravity: 0.915, solidifying point: below −55° C.)
(Note 2) N—cyclohexyl-2-benzothiazolylsulfenamide

TABLE 2

| | Com. Ex. 1 | Com. Ex. 2 | Com. Ex. 3 | Com. Ex. 4 | Ex. 1 | Ex. 2 |
|---|---|---|---|---|---|---|
| Styrene-butadiene rubber | | | | | | |
| Kind | emulsion-polymerized SBR | emulsion-polymerized high styrene SBR | emulsion-polymerized high styrene SBR | emulsion-polymerized SBR | solution-polymerized SBR | solution-polymerized SBR |
| Intrinsic viscosity [η] | 1.75 | 2.5 | 2.5 | 1.75 | 2.10 | 2.10 |
| Styrene content (%) | 23.5 | 35 | 35 | 23.5 | 30 | 30 |
| Vinyl content in butadiene portion (%) (Note 3) | 18 | 19.5 | 19.5 | 18 | 40 | 40 |
| Proportion of modified polymer chains (%) | — | — | — | — | 56 | 56 |
| Carbon black | ISAF | ISAF | N339 | ISAF | ISAF | ISAF |
| Average particle size (mμ) | 20–25 | 20–25 | 26–30 | 20–25 | 20–25 | 20–25 |
| Amount (part) | 60 | 60 | 55 | 60 | 60 | 60 |
| Amount of styrene-butadiene rubber (part) | 60 | 60 | 75 | 60 | 40 | 20 |
| Other rubber components | SBR 1712 (Note 1) | SBR 1500 (Note 2) | SBR 1500 | SBR 1712 | SBR 1500/ SBR 1712 | SBR 1500/ SBR 1712 |
| Amount of other rubber components (part) | 40 | 40 | 25 | 40 | 20/40 | 40/40 |
| Amount of sebacic acid ester (dioctyl sebacate) (part) | 0 | 0 | 0 | 7 | 7 | 7 |
| Hardness (JIS A) (20° C.) | 66 | 66 | 67 | 66 | 66 | 66 |
| Hardness (JIS A) (−10° C.) | 77 | 82 | 84 | 74 | 75 | 74 |

| | Com. Ex. 5 | Ex. 3 | Com. Ex. 6 | Com. Ex. 7 | Ex. 4 |
|---|---|---|---|---|---|
| Styrene-butadiene rubber | | | | | |
| Kind | solution-polymerized SBR | solution-polymerized SBR | solution-polymerized SBR | emulsion-polymerized high styrene SBR | solution-polymerized SBR |
| Intrinsic viscosity [η] | 2.10 | 1.80 | 1.45 | 2.5 | 2.08 |
| Styrene content (%) | 30 | 29 | 30 | 35 | 30 |
| Vinyl content in butadiene portion (%) (Note 3) | 40 | 41 | 40 | 19.5 | 40 |
| Proportion of modified polymer chains (%) | 56 | 50 | — | — | 56 |
| Carbon black | ISAF | N339 | ISAF | ISAF | SAF |
| Average particle size (mμ) | 20–25 | 26–30 | 20–25 | 20–25 | 11–19 |
| Amount (part) | 60 | 60 | 60 | 60 | 60 |
| Amount of styrene-butadiene rubber (part) | 60 | 20 | 40 | 60 | 20 |
| Other rubber components | SBR 1712 | SBR 1712 | SBR 1712 | SBR 1500 | SBR 1500/ SBR 1712 |
| Amount of other rubber components (part) | 40 | 80 | 60 | 40 | 40/40 |
| Amount of sebacic acid ester (dioctyl sebacate) (part) | — | 5 | 7 | 7 | 7 |
| Hardness (JIS A) (20° C.) | 66 | 65 | 66 | 65 | 68 |
| Hardness (JIS A) (−10° C.) | 83 | 73 | 76 | 78 | 75 |

TABLE 3

|  | Com. Ex. 1 | Com. Ex. 2 | Com. Ex. 3 | Com. Ex. 4 | Ex. 1 | Ex. 2 | Com. Ex. 5 | Ex. 3 | Com. Ex. 6 | Com. Ex. 7 | Ex. 4 |
|---|---|---|---|---|---|---|---|---|---|---|---|
| Rolling resistance index | 100 | 103 | 100 | 100 | 96 | 98 | 95 | 98 | 103 | 103 | 96 |
| Wet grip index | 100 | 103 | 102 | 100 | 103 | 102 | 105 | 101 | 102 | 102 | 103 |
| Steering stability | | | | | | | | | | | |
| Handle responsibility | 3 | 3+ | 3 | 3 | 3 | 3+ | 3++ | 3 | 3 | 3+ | 3+ |
| Grip | 3 | 3+ | 3+ | 3 | 3+ | 3 | 3.5 | 3 | 3 | 3+ | 3.5 |
| Straight running stability | 3 | 3 | 3 | 3− | 3+ | 3+ | 3.5 | 3+ | 3 | 3 | 3++ |
| Performance stability | 3 | 3− | 3−− | 3 | 3+ | 3+ | 3++ | 3 | 3− | 3−− | 3+ |
| Running performance in winter | | | | | | | | | | | |
| General road | 3 | 2.5 | 2 | 3+ | 3+ | 3++ | 2 | 3+ | 3 | 3 | 3+ |
| Road covered with snow | 3 | 2 | 1.5 | 3+ | 3 | 3+ | 2− | 3+ | 3 | 3 | 3++ |
| Processability (Note 4) | | | | | | | | | | X | |

(Note 1) Styrene-butadiene rubber made by Sumitomo Chemical Co., Ltd., styrene content 23.5%, vinyl content 18%, intrinsic viscosity $[\eta]$ 2.50
(Note 2) Styrene-butadiene rubber made by Sumitomo Chemical Co., Ltd., styrene content 23.5%, vinyl content 18%, intrinsic viscosity $[\eta]$ 1.75
(Note 3) Measured by infrared spectrophotometry
(Note 4) Processabilities of a rubber composition upon kneading, extruding and molding were synthetically estimated. The mark "" shows good and the mark "X" shows bad.

We claim:

1. A rubber composition for tire tread comprising 15 to 50 parts by weight of a solution-polymerized styrene-butadiene rubber which has an intrinsic viscosity of from not less than 1.7 to less than 3.0 in toluene at 30° C., a bonded styrene content of from not less than 27% by weight to less than 40% by weight and a vinyl content in butadiene portion of from not less than 37% by weight to less than 45% by weight, and in which the proportion of the polymer chains modified with a trifunctional or tetrafunctional coupling agent is from 40 to 65% by weight, 50 to 85 parts by weight of at least one rubber selected from the group consisting of an emulsion-polymerized styrene-butadiene rubber, natural rubber, a synthetic polyisoprene rubber and a butadiene rubber, at least one plasticizer selected from the group consisting of a sebacic acid ester, an adipic acid ester and a fatty acid ester, and carbon black having an average particle size of not more than 30 millimicron.

2. The composition of claim 1, wherein the amount of said plasticizer is from 3 to 20 parts by weight per 100 parts by weight of the rubber component.

3. The composition of claim 1, wherein the amount of the carbon black is from 40 to 80 parts by weight per 100 parts by weight of the rubber component.